Jan. 28, 1969 R. J. STOLLE ETAL 3,424,118
CONVERSION PRESS APPARATUS FOR CAN TREATING
Filed Jan. 6, 1966 Sheet 1 of 5

INVENTOR
RALPH J. STOLLE AND
ELTON G. KAMINSKI,

BY Yungblut, Melville, Strasser and Foster
ATTORNEYS

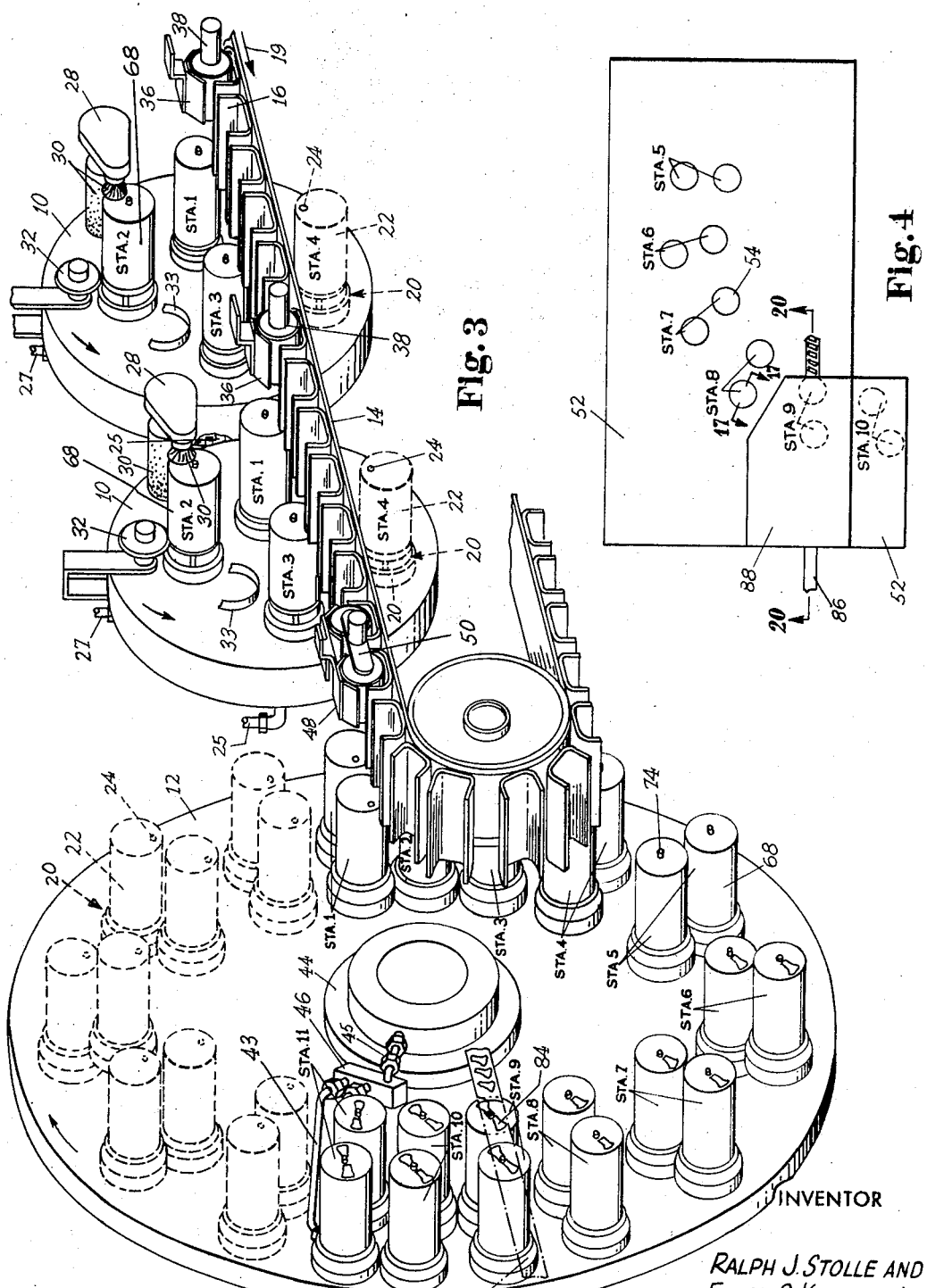

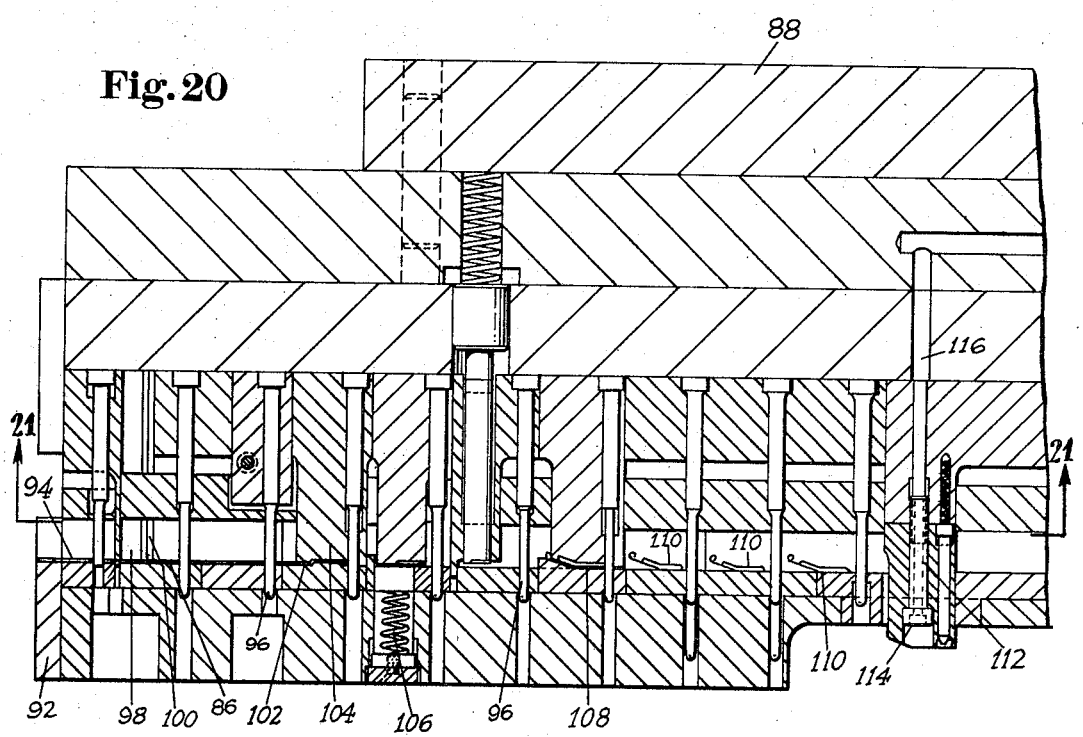
Fig. 20
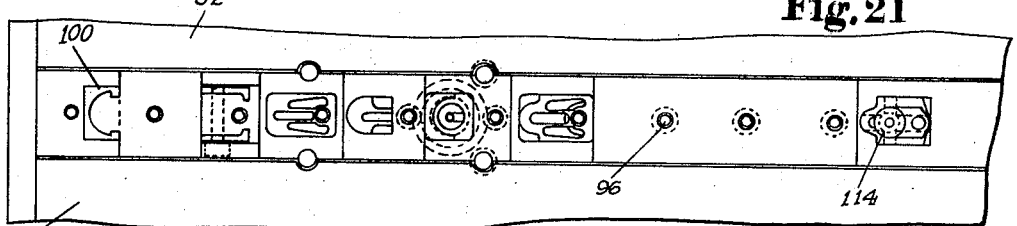
Fig. 21
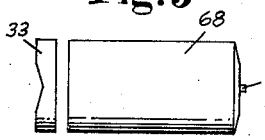
Fig. 5
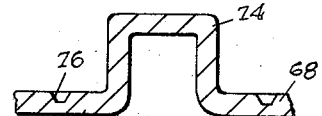
Fig. 9
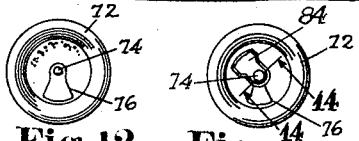
Fig. 12 Fig. 13
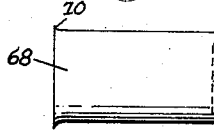
Fig. 6
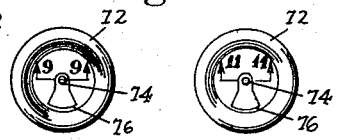
Fig. 11
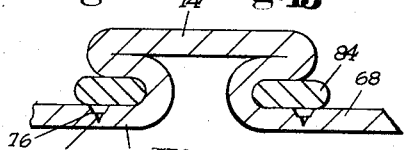
Fig. 14
Fig. 7 Fig. 8 Fig. 10
INVENTOR
RALPH J. STOLLE AND
ELTON G. KAMINSKI,
BY Yungblut, Melville, Strasser and Foster
ATTORNEYS

INVENTOR
RALPH J. STOLLE AND
ELTON G. KAMINSKI,

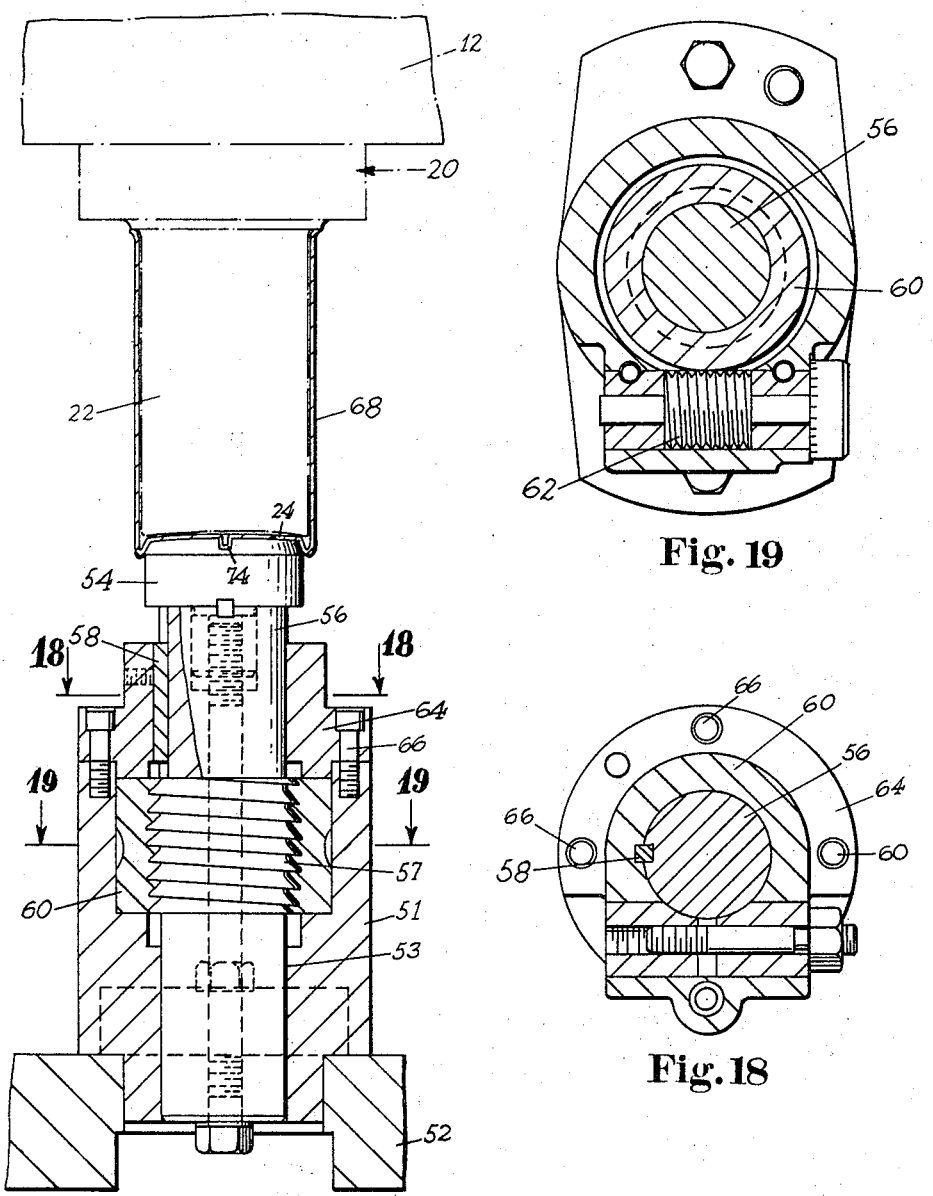

United States Patent Office 3,424,118
Patented Jan. 28, 1969

3,424,118
CONVERSION PRESS APPARATUS
FOR CAN TREATING
Ralph J. Stolle, Lebanon, and Elton G. Kaminski, Sidney, Ohio, assignors to The Stolle Corporation, Sidney, Ohio, a corporation of Ohio
Filed Jan. 6, 1966, Ser. No. 519,025
U.S. Cl. 113—1     33 Claims
Int. Cl. B21d 51/26

ABSTRACT OF THE DISCLOSURE

A can treating machine for performing a plurality of operations on can bodies, each can body having an integral end with a rivet member thereon, comprising three rotating drums, each drum having a plurality of mandrels on its face at various intermediate locations. The drums are indexed by mechanical means such that the mandrels travel intermittently through various stations at which can finishing operations are performed. A conveyor belt travels intermittently and parallel with the drums and aids in the expeditious delivery of the can bodies to the mandrels on the drums. Means are associated with two of the drums to perform trimming operations on depending can body edges and polishing operations on the entire can or any desired portion thereof. The can bodies then proceed to the third drum where they are positioned on the mandrels thereof and the operations of doming, flanging, prescoring, depth scoring, coining and placing and staking the pull key are performed. The can bodies are then discharged.

This invention relates to the treating of cans and to an improved apparatus for use in the manufacture of pull key tab cans.

It has great and particular utility in connection with the method and apparatus disclosed in patent applications Ser. Nos. 452,870, filed June 10, 1965, and 463,499, filed June 14, 1965, now Patent No. 3,339,789, issued Sept. 5, 1967, to achieve an integrated automatic can treating system. More particularly, the inventions of the two patent applications referred to above contemplate a scored metal can and method for manufacturing the same, and a can treating apparatus into which newly formed cans are fed and in which the cans are successively washed, rinsed and dried so as to be ready for decorating.

The present invention contemplates an apparatus for receiving can bodies, each of which has an integral end, and for performing thereon the operations of trimming, polishing, doming, flanging, prescoring, depth scoring, coining and placing and staking the key tab, before they proceed to the can washing apparatus described in the aforementioned patent application.

Metal cans have generally been made either as three-piece or two-piece cans. In the three-piece can, the can body is made from sheet metal and two separate end members are provided which are then secured to the body to complete the can. More recently cans have been made in the two-piece form wherein the can body and one can end are integral and a separate end is later attached to the open end of the piece having the body with one integral end.

Two-piece cans may be made in a variety of ways. One way is the so-called wall iron process wherein a shallow cup is produced from the sheet metal by conventional drawing techniques and is then redrawn to a cup of longer length and smaller diameter and the redrawn cup is then wall ironed to produce the required body length and wall thickness.

A second way of forming a can body with an integral end is the so-called impact and iron forming process wherein a short cup of proper diameter but with a heavy wall thickness is formed by the so-called impact-extrusion-forming process. The impact extruded short cup is then pushed through ironing dies to reduce the wall thickness and increase the length of the cup to the required length for trimming and flanging operations.

A third way of producing a can body with an integral end is the so-called impact-extrusion-forming process wherein a metal disk or slug is extruded into a die in an impact-extrusion-forming apparatus under tremendous pressure. In this process the entire forming operation is completed almost instantaneously and no further ironing of the wall is necessary.

Where a can is formed by the impact-extrusion-forming process or by the impact and iron forming process, and, to a lesser degree, even when it is formed by the draw and iron process, the wall thickness in the end is not uniform. This is particularly true where the can end instead of being flat is concave. This creates a problem in providing a score line to define an area which is to be torn out by means of a pull key tab, in that the score line will tear easily in thin portions of the end wall and will not tear easily in thicker portions thereof.

With the foregoing considerations in mind, one of the principal objects of the present invention is to provide an apparatus which will score a can end integral with a can body, leaving a substantially uniform thickness of metal to be torn during the opening operation.

Another object of the invention is to provide an apparatus which will furnish an integral can body end with a key tab, staking such key tab securely to the can. This has the advantage in that a simple plain can end is all that is required to complete this package.

Still a further object of the invention is to provide an apparatus which will flange the depending edge of a can body and dome the integral end.

A further object of the invention is to provide an apparatus which will perform coining operations (embossing or lettering) on the integral end of a can body.

A further object of the invention is to provide an apparatus which will trim the depending edge of a can body which has been formed by either the so-called wall iron process, the so-called impact and iron forming process, or the so-called impact-extrusion-forming process.

An additional object of the invention is to provide an apparatus which will apply a brushed finish to the can body and integral can end, respectively.

These and other objects of the invention which will be described in more detail hereinafter are accomplished by that certain construction and arrangement of parts of which the following is an exemplary embodiment.

Reference is made to the drawings forming a part hereof and in which:

FIGURE 3 is a partial perspective view of an apparatus according to the present invention.

FIGURE 4 is a plan view of the reciprocating working unit (as seen from the working end) which fits over the operation stations on the rotary dial.

FIGURE 5 is an elevational view of a can body having an integral end.

FIGURE 6 is an elevational view of a can body having an integral end which has been trimmed by an apparatus according to the present invention.

FIGURE 7 is an elevational view of a can body having an integral end which has been domed and flanged by an apparatus according to the present invention.

FIGURE 8 is a view of an integral end of a can body which has been domed, flanged and pre-scored by an apparatus according to the present invention.

FIGURE 9 is a fragmentary cross-sectional view taken on the line 9—9 of FIGURE 8.

FIGURE 10 is a view of an integral end of a can body which has been domed, flanged, pre-scored and depth scored by an apparatus according to the present invention.

FIGURE 11 is a fragmentary cross-sectional view taken on the line 11—11 of FIGURE 10.

FIGURE 12 is a view of an integral end of a can body which has been domed, flanged, pre-scored, depth scored, and coined by an apparatus according to the present invention.

FIGURE 13 is a view of an integral end of a can body which has been domed, flanged, pre-scored, depth scored, coined and which has had the key tab placed and staked on the rivet member of the integral can end by an apparatus according to the present invention.

FIGURE 14 is an enlarged fragmentary cross-sectional view taken along the line 14—14 of FIGURE 13.

FIGURE 17 is a fragmentary sectional view of a working head on the working unit of the rotary dial taken on the line 17—17 of FIGURE 4.

FIGURE 18 is a cross-sectional view taken on the line 18—18 of FIGURE 17.

FIGURE 19 is a cross-sectional view taken on the line 19—19 of FIGURE 17.

FIGURE 20 is a fragmentary cross-sectional view taken on the line 20—20 of FIGURE 4.

FIGURE 21 is a fragmentary cross-sectional view taken on the line 21—21 of FIGURE 20.

Figure 2:
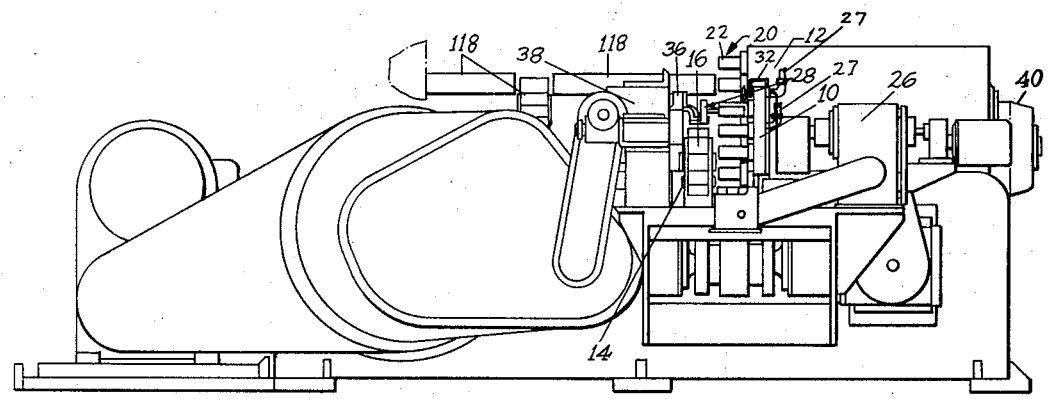
FIGURE 2 is an end elevational view of an apparatus according to the present invention as seen from the lower end of FIGURE 1, i.e., the load end.

Briefly, in the practice of the invention three rotating vertical drums are provided. Each rotating vertical drum has a plurality of mandrels on its face at various intermediate positions. The rotating vertical drums are indexed by mechanical means and the mandrels projecting from their faces travel intermittently through various stations at which can finishing operations are performed. A conveyor belt having a plurality of open-ended U-shaped buckets travels intermittently and parallel with the vertical drums and aids in the expeditious delivery of can bodies with integral ends to the mandrels on the faces of the vertical drums. Means associated with two rotating vertical drums perform trimming operations on depending can body edges and polishing operations on the entire can or on any portion of the can. The cans then proceed to the third vertical drum where they are positioned on its mandrels which travel intermittently through various stations where the operations of doming, flanging, pre-scoring, depth scoring, coining and placing and staking the pull key tab are accomplished. The cans are then discharged into pneumatic tubes or other means where they proceed to the can washing apparatus described in one of the aforementioned patent applications.

Referring now in more detail to the drawings, FIGURES 1, 2, 3, and 4 show the general arrangement of the components of the apparatus. As can be seen, the two drums 10 and the rotary dial 12 extend substantially the entire length of a transfer conveyor belt 14 which travels intermittently parallel to their faces. The transfer conveyor belt 14 has on its surface a plurality of open ended U-shaped buckets 16 which receive previously formed can bodies with integral ends as shown in FIGURE 5.

It should be noted that the can body 68 of FIGURE 5 is made either by the so-called wall iron process, the so-called impact and iron forming process, or by the so-called impact-extrusion-forming process. The wall thickness of the integral end of the cans formed by these processes is not uniform. Thus a problem is created in providing a score line to define an area which was torn out by means of a tab, in that the score line will tear easily in thin portions of the end wall and will not tear easily in thicker portions thereof.

Additionally, it may be seen that the can body 68 of FIGURE 5 contains a rivet member 74, the operation of which will be explained in more detail hereinafter. However, it should be noted that the rivet member 74 is fully generated in two steps: a pre-bubble operation is necessary to form the rivet as shown in FIGURE 5, and a doming operation, such as that performed at station 5 on the rotary dial 12, which will also be explained hereinafter, completes the operation.

Figure 1:
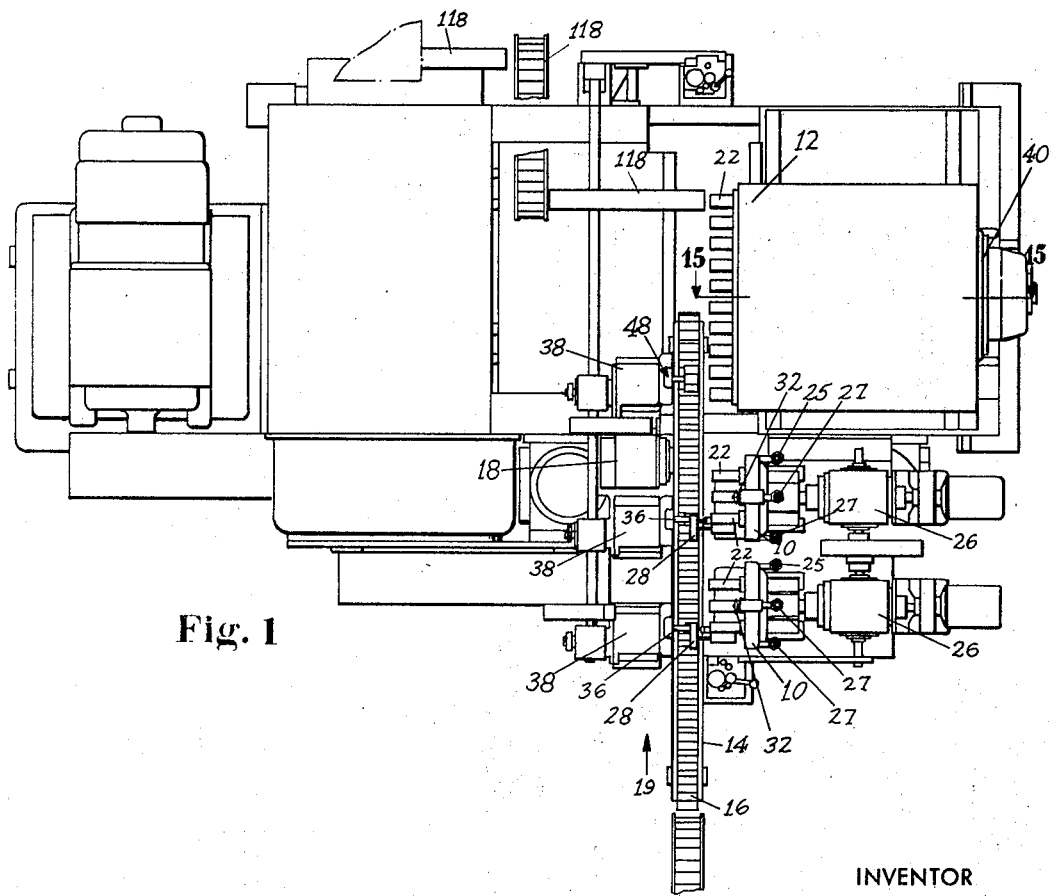
FIGURE 1 is a plan view of an apparatus according to the present invention.

In operation, a can body having an integral end of the nature previously described is delivered to the U-shaped buckets 16 by means of conveyor means or pneumatic tubing. An electric motor or other suitable drive apparatus drives one or more so-called transfer conveyor belt intermitters which are simply conventional apparatuses for converting continuous motion into intermittent motion. One such intermitter is shown at 18 (FIGURE 1). From these intermitters the transfer conveyor belt 14 is driven in a direction indicated by arrow 19.

The drums 10 are identical in operation. Each drum has four rotatably mounted mandrels 20 located 90° apart on its face. The mandrels have outwardly projecting hollow center cores 22, each of which has an aperture 24 in its face. The mandrels 20 are connected by tubing means (not shown) in the rear of each drum 10 to valve means (not shown). The valve means is in turn connected to inlets, one of which supplies air pressure 25, and two of which supply a vacuum 27. Of course, the vacuum aids in loading as well as in holding the can bodies tightly to the mandrel cores 22 while the drums 10 are indexed through stations 1, 2 and 3, as seen in FIGURE 3, while the air pressure aids in discharging the can body back to a U-shaped bucket 16 on the conveyor belt 14 when the can reaches station 3 (FIGURE 3).

Each drum 10 has its intermitter 26 which, like the transfer conveyor belt intermitter 18, converts continuous motion into intermittent motion so that the drums 10 will index to stations 1, 2, 3, and 4, as shown in FIGURE 3. The drums 10 rotate in a counter-clockwise direction.

Between station 1 and station 2 of both drums 10 a small motor 28 is mounted on the drum frame or its own special framework to furnish power for brushes 30 which apply a brushed finish to the can body and can end, or any portion of the can body and can end, as the drum 10 is indexed from station 1 to station 2.

When the can body reaches station 2, its mandrel 20 is caused to rotate, and idler 32, with its sharpened edge, trims the depending can body so that each can will be the same length. The trimmed scrap 33 drops to a receptacle and the center core 22 of the mandrel prevents the can body from coming free of the mandrel. The vacuum provided by inlets 27 holds the can body tight around the mandrel.

When the drum is indexed to station 3, air pressure is supplied through inlet 25 and the can body is discharged onto the U-shaped bucket 16 on the conveyor belt 14.

In operation, can bodies 68 of FIGURE 5, with their integral ends placed away from drums 10, are delivered to the U-shaped bucket 16 on the conveyor belt 14 by means of other conveyor belts or pneumatic tubes. When the cans reach a point opposite station 1, of the drums 10, centering devices 36 are caused to be lowered so that the cans will be centered with respect to the station 1 mandrel. Single mechanical loaders 38, having arms with enlarged heads approximately the size of an integral can end, push against the integral can end, placing the can body on the mandrel. A vacuum is established by means of the aforementioned inlet 27 and mandrel holes 24 and the cans are held securely in place.

It should be understood that both drums 10 are in operation at the same time and that they are both supplied by the same conveyor belt 14. Indexing of the conveyor belt 14, operation of the centering devices 36 and single mechanical loaders 38, and indexing of the drums 10, are all in proper sequence. It will be apparent that operation is such that when the first drum receives a can from its mechanical loader, the second drum receives a can from its mechanical loader, that the mechanical loader of the first drum skipped. Likewise, when the mechanical loader of the second drum skips a can, it is skipping a can which has been trimmed and polished and has been discharged by the first drum.

In order to achieve the operation referred to above, it is necessary that the drums 10 be spaced a multiple of four conveyor buckets 16 apart. That is to say, when both single mechanical loaders 38 are in operation, a multiple of four buckets 16 separate the two cans that are being pushed onto the mandrels 20 at station 1 of each drum 10. At the same time as a can body is being pushed onto each of the mandrels at station 1 of drums 10, a trimmed and polished can body is being discharged from mandrels 20 at station 3 of drums 10 onto conveyor belt 14, two buckets ahead of the cans being pushed onto the mandrels 20. Since mechanical loaders 38 push every other can onto mandrels 20 at station 1 of the drums 10, a can in a single bucket exists between the bucket for the can being pushed on the mandrel 20 at station 1 of drum 10 and the bucket for the can being discharged from the mandrel at station 3 of drum 10.

Figure 15:
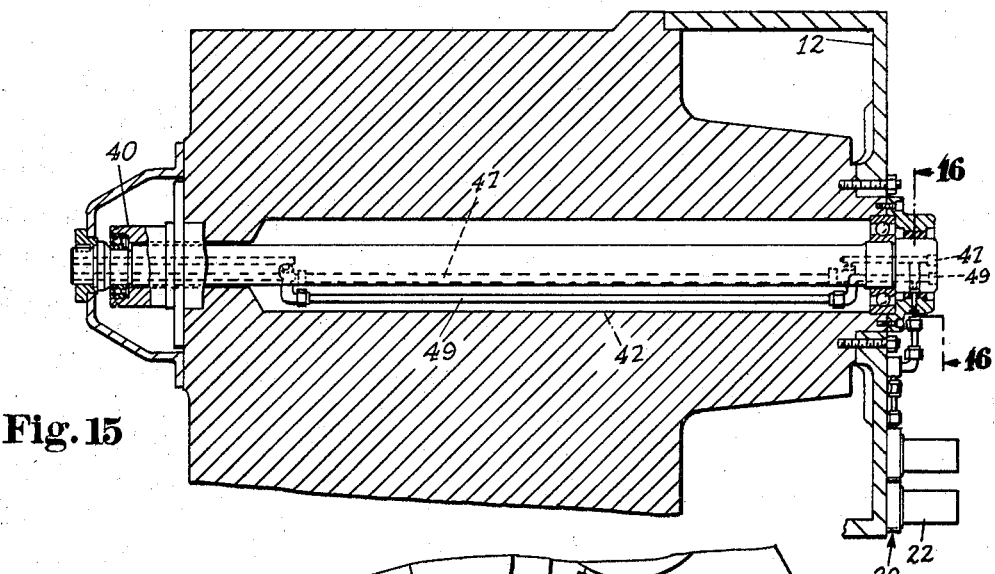
FIGURE 15 is a fragmentary cross-sectional view taken on the line 15—15 of FIGURE 1.

The necessary result of the aforementioned discussion is that two brush finished, trimmed cans (as seen in FIGURE 6) are ready for the rotary dial 12. The rotary dial 12 has a plurality of pairs of juxtaposed mandrels 20, identical to those previously discussed in connection with drums 10, except they are not rotatably mounted, projecting from its face. The rotary dial 12 rotates in a clockwise direction, opposite to the counter-clockwise rotation of the drums 10. Rotary dial intermitter 40 drives the rotary dial and converts continuous motion into intermittent motion so that the rotary dial will index to the various stations shown in FIGURE 3. FIGURE 15 shows a cross section of the rotary dial 12 showing the intermitter 40.

Figure 16:
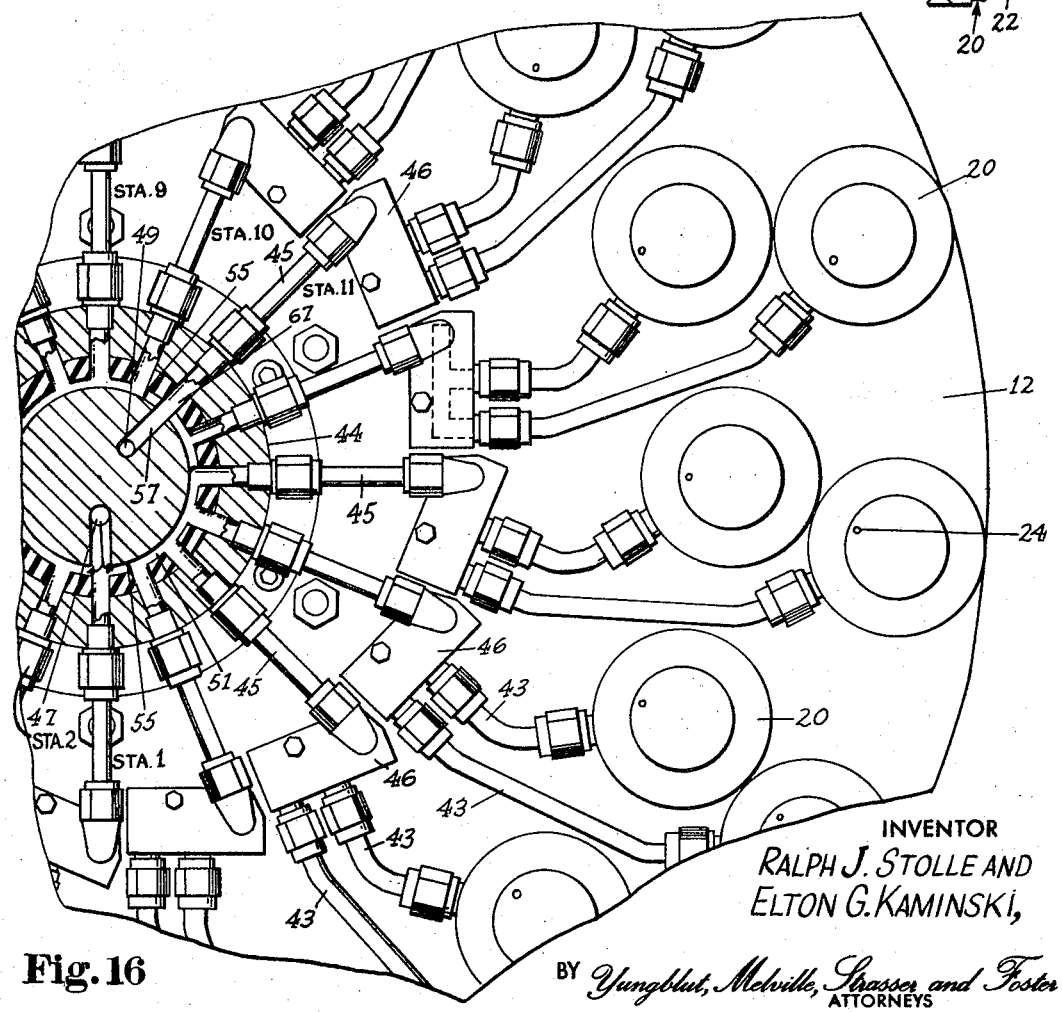
FIGURE 16 is a fragmentary cross-sectional view taken on the line 16—16 of FIGURE 15.

FIGURE 15 shows tubing 47 and 49 through which either air pressure or vacuum may be supplied for proper operation of mandrels 20 on the face of rotary dial 12. The operation of tubes 47 and 49 with mandrels 20 on the rotary dial 12 is identical to the operation of tubes 25 and 27 with the mandrels 20 of drums 10. The tubing 47 and 49 proceeds from a source through rotary dial hollow core 42 into a valve distributor 44 (FIGURE 16). Each one of the pair of juxtaposed mandrels 20 is individually connected by tubing 43 to a junction box 46 for that pair of mandrels. The junction box 46 is in turn connected by tubing 45 to the valve distributor 44. Tubing 47 is the vacuum supply and tubing 49 is the air supply. Vacuum tubing 47 leads into a circular recess 51. It should be noted that fingers 55 assure that there will only be a vacuum supplied to mandrels 20 to hold the can bodies tightly to them when the pairs of mandrels are in the positions of station 1 to station 10. At station 11, duct 57 from air tube 49 meets tubing 45 and facilitates discharge of the can bodies by pushing the cans off mandrels 20.

Two cans from drums 10 are readied for rotary dial 12 by a double centering device 48 which is lowered to properly center the can bodies for placement on the mandrels 20 at station 1. A double mechanical loader 50, having two arms, each with an enlarged head approximately the size of an integral can end, pushes two cans onto a pair of juxtaposed mandrels at station 1. As was previously explained, a vacuum in mandrels 20 while they are at the positions of station 1 to station 10, holds the can bodies tightly to the mandrels. The rotary dial 12 is then indexed through the various indicated stations. Stations 5, 6, 7, 8, 9 and 10, are the working stations. Station 11 is the unloading or discharge station.

FIGURE 4 indicates a working unit which is reciprocated against rotary dial 12 by an eccentric horizontal crank press, or other means. This unit fits over the aforementioned six operating stations (stations 5 to 10) and performs all operations on all cans presented to it as the rotary dial 12 is indexed.

Essentially, the working unit of FIGURE 4 which reciprocates against rotary dial 12 comprises a base 52 which has a plurality of working stations with head units corresponding to the operating stations 5 to 10 on rotary dial 12. A cross section of such a head unit (not including the head unit at station 9) is shown generally in FIGURE 17. The head unit contains a head 54 mounted on a spindle 56 which is threaded in its intermediate portion 57. Internally threaded worm wheel 60 fits around threaded portion 57 of spindle 56. Worm 62 may be turned so as to rotate worm wheel 60 which in turn moves spindle 56 unidirectionally. Spindle 56 fits inside bore 53 of housing 51, being held securely by means of bracket 64 and bolts 66. Key 58 precludes rotation of spindle 56 and allows only for its movement in one direction as worm 62 is rotated.

It should be noted that head 54 moves against a can 68 which is on a mandrel 20 of the rotary dial 12 by means of an eccentric horizontal crank press which reciprocates the whole base 52 and not by means of worm 62. Worm 62 is used primarily to adjust head 54 in order to account for wear. Also, it should be obvious that operations are performed at all working stations simultaneously as unit 52 reciprocates. Additionally, it should be apparent that the varied operations at the different working stations are performed by simply varying the type of head 54.

As was previously stated, the working operations of the rotary dial 12 are performed at stations 5 through 10. At station 5 the doming and flanging operations are performed. Basically, the head 54 of the reciprocating unit at station 5 consists of a die somewhat smaller than the integral can end, with a slight aperture therein to receive rivet member 74. This head reciprocates against the integral end of the can body, pushing the can against its mandrel 20 so as to flange the bottom edge of the can body 70 and to dome the integral end 72 inwardly except for rivet member 74 (as shown in FIGURE 6), the use of which will be explained at a later time. After the doming operation the rivet member 74 is fully generated.

When the cans on the rotary dial 12 reach station 6 the pre-score operation is performed. It should be pointed out that regardless of the method of forming the integral can end, the can end will generally not be of absolutely uniform thickness, so that when a score line is formed in such a can end, heavier sections will remain to be torn in some portions of the score line and not in others. Accordingly, the can end is subjected to a pre-scoring operation wherein a flat bottomed groove 76 (FIGURES 8 and 10) is formed where the depth score line will later be formed. As a result of this pre-scoring operation, the depth of the metal below the bottom of the groove 76, i.e., the thickness of the can between the bottom of the groove 76 and the inside can end surface 78, will be substantially constant (as seen in FIGURE 9) and a score line can thereafter be formed in the groove 76 so that the area to be torn out may then be torn out without difficulty.

It is, of course, apparent that the head 54 of the reciprocating working unit for station 6 of the rotary dial 12 consists of a die, the surface of which has an outwardly projecting flange or spur identical with the cross section of the groove 76, as shown in FIGURE 9, and shaped like the area to be torn out.

It will also be understood that it is only necessary to pre-score the flat bottomed groove 76 to such a depth that nowhere in the groove will the remaining metal between the bottom of the groove 76 and the inside surface 78 be thicker than the thinnest portion of the can end in the region where the score line is to be formed. In other words, the pre-scoring need be carried on only such that a slight impression is achieved in the thinnest area of the can end. In this way a substantial thickness of metal will be left between the bottom of the groove 76 and the inside surface 78 in which the depth score line may be formed.

The operation of depth scoring is preformed at station 7 of the rotary dial. Essentially, this operation consists of formation of a score line 80 in the bottom of groove 76, as best seen in FIGURES 10 and 11. The score line 80 will, of course, be preferably disposed substantially medially in the groove 76. As a result of the fact that the distance between the bottom of groove 76 and the inside surface 78 of the can is substantially constant, the material to be torn in opening a can between the bottom of score line 80 and the inside surface 78 of the can end will be substantially uniform and the area of the can end within the score line can easily be torn out of the can end.

It will, of course, be apparent that head 54 mounted on spindle 56 at station 7 of the reciprocating working unit shown in FIGURE 4 has a flat surface with a sharp projecting knife-like edge, the shape of the depth score line to be made.

The operation of coining is performed at station 8 of rotary dial 12; that is to say, the integral can end is embossed or lettered (as shown in FIGURE 12) with, for example, instructions concerning the key tab operation.

It will, of course, be apparent that head 54 mounted on spindle 56 at station 8 of the reciprocating working unit shown in FIGURE 4 has a flat surface with the printing to be embossed on the integral can end projecting therefrom.

If the can body having an integral can end has been formed by the impact-extrusion-forming process or by the impact and iron forming process, rivet member 74 is produced during the impact-extrusion portion of these processes. The operation at station 9 of the rotary dial 12 provides for positioning or placement of a key tab 84 over rivet member 74 in the integral can end.

Key tabs 84 are punched out of a metal strip 86 which is fed into an enclosure 88 at station 9 on the reciprocating working unit shown in FIGURE 4. It should be noted that the head unit of FIGURES 17, 18 and 19 which is positioned at all other stations on the reciprocating working unit which match the stations on rotary dial 12 is not present at station 9.

FIGURE 20 is a partial cross-setcional view through enclosure 88 on the reciprocating working unit of FIGURE 4, taken on line 20—20 of FIGURE 4, and it illustrates the essential operations as metal strips 86 are fed into the enclosure 88. The enclosure 88 comprises an upper platen 90 and a lower platen 92. The upper platen 90 reciprocates against the lower platen 92. A channel 94 is located in the face of the lower platen 92 and means are provided for intermittently indexing metal strips 86 through this channel. Guide pins 96 aid in positioning metal strips 86 as they proceed along channel 94.

As can best be seen in FIGURE 20, various operations are performed on metal strips 86 as they are indexed along channel 94 so that finished key tabs 84 are available to place upon rivet member 74 of integral can end of the cans which have been indexed to station 9 on rotary dial 12. The various operations performed on metal strips 86 will now be briefly described. At position 98 depending edge 100 scores the metal strip 86 in the first operation. At position 102 dies 104 form the key tab. Spring member 106 pushes against metal strip 86 so that it will be released from dies 104 when the male element of the die in the lower platen 92 is pushed into the female element of the die in the upper platen 90.

When the metal strip is at position 108 a die bends it upwardly and curls the end of the upward portion. As can be seen, completed key tabs 84 are at positions 110 ready for insertion on the receiving can on the rotary dial 12 at station 9.

It will be understood that the operations performed on metal strips 86 and indexing of metal strips 86 will be such that two completed key tabs 84 will always be ready for insertion on cans at station 9 of the rotary dial 12. It will also be understood that virtually any shaped tab can be produced and applied by the conversion press of the instant invention, and, therefore, the style and shape of the key tab 84 is exemplary only.

The insertion operation is accomplished when the completed key tabs 84 are at positions 112 (only one such position is shown for simplicity, but it will be understood that two positions 112 are required because two cans are on a pair of mandrels 20 at station 9 of rotary dial 12). Member 114 forces the completed key tab 84 out of the metal strip 86. A vacuum is provided in duct 116 to hold the completed key tab 84 in place until it comes to rest on the rivet member 74 of an integral can end of a can at station 9 of rotary dial 12.

In order to assure that the key tab 84 does not rotate around or come off of rivet member 74 during the indexing of the rotary dial 12 between station 9 and station 10, the rivet member 74 is pre-staked or initially set by member 114.

When the cans or rotary dial 12 are indexed to station 10, the staking operation is performed whereby the rivet member 74 of the integral can ends is flattened down on top of the key tab 84 as shown in FIGURE 13.

As was previously explained, when a pair of juxtaposed cans is indexed to station 11 of rotary dial 12, the discharge station, an air tube 57 in valve distributor 44 comes into contact with tubing 45 leading to junction box 46 and onto mandrels 20, ending the vacuum which has heretofore been maintained in order to secure the cans to the mandrels 20. The air pressure through apertures 24 thus forces the cans off mandrels 20 into pneumatic tubes 118 which lead to a can washing apparatus described in patent application Ser. No. 462,870 filed June 10, 1965.

It will be understood that modifications may be made without departing from the spirit of the invention, and therefore no limitations other than those specifically set forth in the claims are intended or should be implied.

The embodiments of the invention in which an exclusive property or privilege is claimed are defined as follows:

1. A can treating machine for performing a plurality of operations on can bodies, each can body having an integral end with a rivet member, which comprises:
   (a) an endless conveyor belt having can receiving means mounted thereon;
   (b) means to supply said can bodies to said can receiving means;
   (c) means for driving said conveyor belt intermittently to cause said can receiving means to advance in equal increments;
   (d) at least one drum adjacent said conveyor belt, rotatably mounted on an axis substantially normal to the path of said conveyor belt;
   (e) a first loader to supply said can bodies from said can receiving means to said drum;
   (f) means associated with said drum for securing said can bodies thereto;
   (g) means associated with said drum for performing operations on said can bodies secured thereon;
   (h) means associated with said drum to discharge said can bodies to said can receiving means;
   (i) means for rotating said drum intermittently and in timed sequence with said conveyor belt;
   (j) a rotary dial, adjacent said conveyor belt, rotatably mounted on an axis substantially normal to the path of said conveyor belt;
   (k) a second loader to supply said can bodies from said can receiving means to said rotary dial;
   (l) means associated with said rotary dial for securing said can bodies thereto;
   (m) means for rotating said rotary dial intermittently and in timed sequence with said conveyor belt;
   (n) a working unit associated with said rotary dial mounted for reciprocation in a path substantially normal to the path of said conveyor belt and movable toward and away from said dial;

(o) means for reciprocating said working unit in timed sequence with the rotation of said rotary dial;

(p) means associated with said rotary dial to discharge said can bodies therefrom.

2. The machine according to claim 1 wherein said can receiving means comprises a plurality of parallel U-shaped buckets.

3. The machine according to claim 1 wherein said first loader comprises centering means, said centering means having an angular plate substantially the width of one said can body and mounted for reciprocation in a path above and substantially normal to the path of said conveyor belt and movable in a position contiguous with said can bodies in said can receiving means and a space therefrom, and loading means, said loading means having an arm, said arm having an enlarged head substantially the size of said integral end of one said can body, and mounted for reciprocation in a path substantially normal to the path of said conveyor belt and movable toward and away from said drum.

4. The machine according to claim 1 wherein said means associated with said drum for securing said can bodies thereto comprises a plurality of hollow mandrels rotatably mounted on said drum for receiving said can bodies from can receiving means, each of said mandrels being substantially the size of one said can body and having an integral end with at least one aperture therein, and a vacuum means associated with each said mandrel whereby a suction is created to load and hold said can bodies on said mandrels.

5. The machine according to claim 4 wherein said means associated with said drum for performing operations on said can bodies secured thereon comprises a rotatably mounted, sharp edged idler, said idler being positioned so as to be contiguous with one said can body on one said mandrel as said drum is rotated intermittently, and means to rotate said mandrel when said mandrel is contiguous with said idler whereby said can body is trimmed.

6. The machine according to claim 4 wherein said means associated with said drum for performing operations on said can bodies secured thereon comprises a plurality of can polishing brushes and motor means associated therewith to rotatively move said brushes, at least one of said brushes being positioned on an axis substantially parallel to the axis of said mandrels for rotation contiguous with one said body on one said mandrel, and at least one of said brushes being positioned on an axis substantially normal to the axis of said mandrels for rotation contiguous with said integral end of one said can body on one said mandrel.

7. The machine according to claim 4 wherein means associated with said drum to discharge said can bodies to said can receiving means comprises air pressure means associated with each said mandrel.

8. The machine according to claim 1 wherein said second loader comprises centering means, said centering means having an angular plate substantially the width of two said can bodies and mounted for reciprocation in a path above and substantially normal to the path of said conveyor belt and movable in a position contiguous with said can bodies in said can receiving means and a space therefrom, and loading means, said loading means having an arm, said arm having two enlarged heads, each of said heads being substantially the size of said integral end of one said can body, and mounted for reciprocation in a path substantially normal to the path of said conveyor belt and movable toward and away from said rotary dial.

9. The machine according to claim 1 wherein means associated with said rotary dial for securing said can bodies thereto comprises a plurality of hollow mandrels mounted on said dial for receiving said can bodies from said can receiving means, each of said mandrels being substantially the size of one said can body and having an integral end with at least one aperture therein, and a vacuum means associated with each said mandrel whereby a suction is created to load and hold said can bodies on said mandrels.

10. The machine according to claim 9 wherein said working unit associated with said rotary dial comprises a base member, said base member having a plurality of working stations positioned thereon which contact said integral ends of said can bodies on said mandrels of said rotary dial as said working unit is reciprocated and said rotary dial is rotated intermittently.

11. The machine according to claim 9 wherein said means associated with said rotary dial to discharge said can bodies therefrom comprises air pressure means associated with each said mandrel.

12. A can treating machine for performing a plurality of operations on can bodies, each can body having an integral end with a rivet member, which comprises:

(a) an endless conveyor belt having a plurality of can receiving means mounted thereon;

(b) means to supply said can bodies to said can receiving means;

(c) means for driving said conveyor belt intermittently to cause said can receiving means to advance in equal increments;

(d) at least one drum adjacent said conveyor belt, rotatably mounted on an axis substantially normal to and in a plane substantially parallel with the path of said conveyor belt;

(e) a loader to supply said can bodies from said can receiving means to said drum;

(f) means associated with said drum for securing said can bodies thereto;

(g) means associated with said drum for performing operations on said can bodies secured thereon;

(h) means associated with said drum to discharge said can bodies therefrom;

(i) means for rotating said drum intermittently and in timed sequence with said conveyor belt.

13. The machine according to claim 12 wherein said loader comprises centering means, said centering means having an angular plate substantially the width of one said can body and mounted for reciprocation in a path above and substantially normal to the path of said conveyor belt and movable in a position contiguous with said can bodies in said can receiving means and a space therefrom, and loading means, said loading means having an arm, said arm having an enlarged head substantially the size of said integral end of one said can body, and mounted for reciprocation in a path substantially normal to the path of said conveyor belt and movable toward and away from said drum.

14. The machine according to claim 12 wherein said means associated with said drum for securing said can bodies thereto comprises a plurality of hollow mandrels rotatably mounted on said drum for receiving said can bodies from said can receiving means, each of said mandrels being substantially the size of one said can body and having an integral end with at least one aperture therein, and a vacuum means associated with each said mandrel whereby a suction is created to load and hold said can bodies on said mandrels.

15. The machine according to claim 14 wherein said means associated with said drum for performing operations on said can bodies secured thereon comprises a rotatably mounted, sharp edged idler, said idler being positioned so as to be contiguous with one said can body on one said mandrel as said drum is rotated intermittently, and means to rotate said mandrel when said mandrel is contiguous with said idler whereby said can body is trimmed.

16. The machine according to claim 14 wherein said means associated with said drum for performing operations on said can bodies secured thereon comprises a plurality of can polishing brushes and motor means associated therewith to rotatively move said brushes, at least one of said brushes being positioned on an axis substantially parallel to the axis of said mandrels for rotation contiguous with one said body on one said mandrel, and at least one of said brushes being positioned on an axis substantially normal to the axis of said mandrels for rotation contiguous with said integral end of one said can body on one said mandrel.

17. The machine according to claim 14 wherein means associated with said drum to discharge said can bodies to said receiving means comprises air pressure means associated with each said mandrel.

18. A can treating machine for performing a plurality of operations on can bodies, each can body having an integral end with a rivet member, which comprises:
   (a) an endless conveyor belt having can receiving means mounted thereon;
   (b) means to supply said can bodies to said can receiving means;
   (c) means for driving said conveyor belt intermittently to cause said can receiving means to advance in equal increments;
   (d) a rotary dial, adjacent said conveyor belt, rotatably mounted on an axis substantially normal to and in a plane substantial parallel with the path of said conveyor belt;
   (e) a loader to supply said can bodies from said can receiving means to said rotary dial;
   (f) means associated with said rotary dial for securing said can bodies thereto;
   (g) means for rotating said rotary dial intermittently and in timed sequence with said conveyor belt;
   (h) a working unit associated with said rotary dial, mounted for reciprocation in a path substantially normal to the path of said conveyor belt and movable in a position to said dial and a space therefrom;
   (i) means for reciprocating said working unit in timed sequence with the rotation of said rotary dial;
   (j) means associated with said rotary dial to discharge said can bodies therefrom.

19. The machine according to claim 18 wherein said loader comprises centering means, said centering means having an angular plate substantially the width of two said can bodies and mounted for reciprocation in a path above and substantially normal to the path of said conveyor belt and movable in a position contiguous with said can bodies in said can receiving means and a space therefrom, and loading means, said loading means having an arm, said arm having two enlarged heads, each of said heads being substantially the size of said integral end of one said can body, and mounted for reciprocation in a path substantially normal to the path of said conveyor belt and movable toward and away from said rotary dial.

20. The machine according to claim 18 wherein means associated with said rotary dial for securing said can bodies thereto comprises a plurality of hollow mandrels mounted on said dial for receiving said can bodies from said can receiving means, each of said mandrels being substantially the size of one said can body and having an integral end with at least one aperture therein, and a vacuum means associated with each said mandrel whereby a suction is created to load and hold said can bodies on said mandrels.

21. The machine according to claim 20 wherein said working unit associated with said rotary dial comprises a base member, said base member having a plurality of working stations positioned thereon which contact said integral ends of said can bodies on said mandrels of said rotary dial as said working unit is reciprocated and said rotary dial is rotated intermittently.

22. The machine according to claim 20 wherein means associated with said rotary dial to discharge said can bodies therefrom comprises air pressure means associated with each said mandrel.

23. A can treating machine for performing a plurality of operations on can bodies, each can body having an integral end with a rivet member, which comprises:
   (a) an endless conveyor belt having can receiving means mounted thereon;
   (b) means to supply said can bodies to said can receiving means;
   (c) means for driving said conveyor belt intermittently to cause said can receiving means to advance in equal increments;
   (d) two drums adjacent said conveyor belt, rotatably mounted on an axis substantially normal to the path of said conveyor belt;
   (e) a first loader to supply said can bodies from said can receiving means to said drum;
   (f) means associated with said drum for securing said can bodies thereto;
   (g) means associated with said drum for performing operations on said can bodies secured thereon;
   (h) means associated with said drum to discharge said can bodies to said can receiving means;
   (i) means for rotating said drum intermittently and in timed sequence with said conveyor belt;
   (j) a rotary dial, adjacent said conveyor belt, rotatably mounted on an axis substantially normal to the path of said conveyor belt;
   (k) a second loader to supply said can bodies from said can receiving means to said rotary dial;
   (l) means associated with said rotary dial for securing said can bodies thereto;
   (m) means for rotating said rotary dial intermittently and in timed sequence with said conveyor belt;
   (n) a working unit associated with said rotary dial mounted for reciprocation in a path substantially normal to the path of said conveyor belt and movable toward and away from said dial;
   (o) means for reciprocating said working unit in timed sequence with the rotation of said rotary dial;
   (p) means associated with said rotary dial to discharge said can bodies therefrom.

24. The machine according to claim 23 wherein said can receiving means comprises a plurality of parallel U-shaped buckets.

25. The machine according to claim 24 wherein said first loader comprises centering means, said centering means having an angular plate substantially the width of one said can body and mounted for reciprocation in a path above and substantially normal to the path of said conveyor belt and movable in a position contiguous with said can bodies in said can receiving means and a space therefrom, and loading means, said loading means having an arm, said arm having an enlarged head substantially the size of said integral end of one said can body, and mounted for reciprocation in a path substantially normal to the path of said conveyor belt and movable toward and away from said drum.

26. The machine according to claim 25 wherein said means associated with said drum for securing said can bodies thereto comprises a plurality of hollow mandrels rotatably mounted on said drum for receiving said can bodies from said can receiving means, each of said mandrels being substantially the size of one said can body and having an integral end with at least one aperture therein, and a vacuum means associated with each said mandrel whereby a suction is created to load and hold said can bodies on said mandrels.

27. The machine according to claim 26 wherein said means associated with said drum for performing operations on said can bodies secured thereon comprises a rotatably mounted, sharp edged idler, said idler being positioned so as to be contiguous with one said can body on one said mandrel as said drum is rotated intermittently, and means to rotate said mandrel when said mandrel is contiguous with said idler whereby said can body is trimmed.

28. The machine according to claim 27 wherein said means associated with said drum for performing operations on said can bodies secured thereon comprises a plurality of can polishing brushes and motor means associated therewith to rotatively move said brushes, at least one of said brushes being positioned on an axis substantially parallel to the axis of said mandrels for rotation contiguous with one said body on one said mandrel, and at least one of said brushes being positioned on an axis substantially normal to the axis of said mandrels for rotation contiguous with said integral end of one said can body on one said mandrel.

29. The machine according to claim 28 wherein means associated with said drum to discharge said can bodies to said can receiving means comprises air pressure means associated with each said mandrel.

30. The machine according to claim 29 wherein said second loader comprises centering means, said centering means having an angular plate substantially the width of two said can bodies and mounted for reciprocation in a path above and substantially normal to the path of said conveyor belt and movable in a position contiguous with said can bodies in said can receiving means and a space therefrom, and loading means, said loading means having an arm, said arm having two enlarged heads, each of said heads being substantially the size of said integral end of one said can body, and mounted for reciprocation in a path substantially normal to the path of said conveyor belt and movable toward and away from said rotary dial.

31. The machine according to claim 30 wherein means associated with said rotary dial for securing said can bodies thereto comprises a plurality of hollow mandrels mounted circularly on said dial in juxtaposed pairs for receiving said can bodies from said can receiving means, each of said mandrels being substantially the size of one said can body and having an integral end with at least one aperture therein, and a vacuum means associated with each said mandrel whereby a suction is created to load and hold said can bodies on said mandrels.

32. The machine according to claim 31 wherein said working unit associated with said rotary dial comprises a base member, said base member having a plurality of working stations positioned circularly in juxtaposed pairs thereon which contact said integral ends of said can bodies on said mandrels of said rotary dial as said working unit is reciprocated and said rotary dial is rotated intermittently.

33. The machine according to claim 32 wherein said means associated with said rotary dial to discharge said can bodies therefrom comprises air pressure means associated with each said mandrel.

References Cited

UNITED STATES PATENTS 3,191,354   6/1965   McElroy et al. _____ 53—112

RICHARD J. HERBST, *Primary Examiner.*

R. D. GREFE, *Assistant Examiner.*

U.S. Cl. X.R.

113—11, 14, 27